United States Patent [19]

Tyagi et al.

[11] Patent Number: 5,217,615
[45] Date of Patent: Jun. 8, 1993

[54] BACTERIAL LEACHING PROCESS AND COMPOSITION

[75] Inventors: Rajeshwar D. Tyagi, Ste-Foy; Devender K. Jain, Ontario; Denis Couillard, Ancienne-Lorette, all of Canada

[73] Assignee: Institut National de la Recherche Scientifique, Ste-Foy, Canada

[21] Appl. No.: 659,723

[22] Filed: Feb. 25, 1991

[51] Int. Cl.$^5$ .......................... C02F 3/34; C02F 11/00; C22B 3/00
[52] U.S. Cl. .................................. 210/611; 210/631; 210/912; 435/252.4; 435/832
[58] Field of Search ................................ 210/609–613, 210/620, 631, 912; 435/252.1, 252.4, 252.5, 282, 822, 832

[56] References Cited

U.S. PATENT DOCUMENTS

| | | | |
|---|---|---|---|
| 3,455,679 | 7/1969 | Maying | 75/101 |
| 3,627,676 | 12/1971 | Eccles, Jr. | 210/611 |
| 3,878,303 | 4/1975 | Hashimoto | 210/612 |
| 4,155,810 | 5/1979 | Kitajima et al. | 435/252.4 |
| 4,206,288 | 6/1980 | Detz et al. | 435/282 |
| 4,596,778 | 6/1986 | Hitzman | 435/252.1 |
| 4,775,627 | 10/1988 | Attia et al. | 435/282 |
| 4,790,940 | 12/1988 | Castaldi et al. | 210/611 |
| 4,918,018 | 4/1990 | Waskovsky | 435/252.1 |
| 5,002,888 | 3/1991 | Kilbane, II | 435/252.4 |

OTHER PUBLICATIONS

Hayes et al, Heavy Metal Removal From Sludges Using Combined Biological/Chemical Treatment, Department of Agricultural Engineering, Cornell University, Ithica, NY 14853 1980, Proc. 34th Ind. Waste Conference, Purdue University, pp. 529–543.

Jenkins et al., Metals Removal and Recovery from Municipal Sludge, Jan. 1981, Journal WPCF, vol. 53, No. 1, pp. 25–32.

Int'l. Metallurgical Rev., Rev. 179, vol. 19, No. 3, Mar. 1974 pp. 25–31, Use of Micro-Organisms For the Recovery of Metals.

GWF Wasser Abwasser vol. 120, No. 7, Jul. 1979, pp. 329–335 Entfernung Von Schwermetallen Aus Klarschlammen Durch Bakterielle Laugung, Schonborn et al.

Primary Examiner—Thomas Wyse
Attorney, Agent, or Firm—Cushman, Darby & Cushman

[57] ABSTRACT

The present invention relates to a process for removing heavy metals and substantially destroying indicator bacteria present in municipal sludges, which comprises: lowering, under aerobic conditions, the pH of a municipal sludge from about 7 to 8 to about 2.0 to 2.5 by adding to said sludge 10% by volume of an inoculum containing a mixture of microorganisms comprising *Thiobacillus thiooxidans* ATCC 55127 and *Thiobacillus thioparus* ATCC 55128 with 1 to 3 g per liter of sulphur, and incubating for a period of at least 40 hours where the heavy metals originally present in said sludge have been substantially solubilized and the concentration of the indicator bacteria have been lowered to a non-toxic level; and recovering the metals from the low pH treated sludge of step a).

4 Claims, 11 Drawing Sheets

BACTERIAL LEACHING PROCESS AND COMPOSITION

BACKGROUND OF THE INVENTION

Sewage treatment plant operations usually generate significant quantities of residual sludges. Million of tonnes of sewage sludges are produced worldwide every year. The treatment and final disposition of residual sludges often constitutes the most expensive stage in the treatment of municipal wastewaters and remains a difficult environmental issue.

The main concern in the disposal of the sludge is the presence of toxic heavy metals in the sludge. Heavy metals are concentrated in sewage sludge during the treatment of sludges due to various physic-chemical and biological interactions. The heavy metal content of sewage sludge is about 0.5 to 2% on a dry weight basis. In some cases, extremely high concentrations (up to 4% w/w) of Cd, Cr, Cu, Ni, Pb and Zn have been reported.

Several optional methods for the disposal of municipal sludges could be utilized such as land filling, incineration, oceanic dumping and spreading on agricultural and/or forest lands as fertilizer.

However, the presence of pathogenic microorganisms and elevated concentration of heavy metals present a serious constraint to the implementation of these practices.

Disposal of heavy metal contaminated sludge by these practices pose the following potential risks and problems:

1) Disposal of the metal contaminated sludge in the marine environment involves the danger of accumulation of heavy metals in marine species especially in those which are used for human consumption.
2) High levels of heavy metals released from the sludge can have toxic and lethal effects on marine life.
3) Incineration is costly due to high energy consumption. Moreover heavy metals which remain with the incinerator ashes must be removed before the ash is finally disposed.
4) The biggest risk associated with land filling of the metal contaminated sludge and/or ash, and spreading of the sludge on agricultural and/or forest lands is leaching of heavy metals into surface and ground waters. These may have serious consequences where these waters are used for drinking-/recreation by humans and animals.
5) Disposal of the sewage sludge on agricultural land is one of the most economical means of disposal because of its characteristics of being a good fertilizer. However, uptake of heavy metals by plants and the subsequent accumulation of metals in the food chain via plants and animals can be a potential health hazard.

Epidemiological studies to determine disease transmission following the use of sludges as a fertilizer were conducted. These studies have shown that risk of infection is associated with the presence of pathogenic bacteria and helminthic worms.

To prevent environmental pollution and health risks by heavy metals, the content of heavy metals of sewage sludge must be reduced up to a level recommended by the guidelines of various regional municipalities and local governments. The reduction of heavy metals in sewage sludge can be achieved; (I) by source control of discharge to sewer systems or (II) by removing metals from sludge. In source control, the major difficulty resides in the identification of the sources. Moreover, even with complete elimination of toxic metals from all industrial discharges to sewers, the problem remains because of the metal content of domestic wastewater and runoff water. Therefore, to reduce environmental pollution and health hazards by heavy metals from sewage sludge, the heavy metals must be removed before its final disposal. Since large quantities of sludge are generated every day, the process of heavy metals removal should be easy to operate as well as rapid and economical.

Several chemical processes for the removal of heavy metal have been proposed (Hayes et al., 1980, Proc. 34th Ind. Waste Conference, Purdue University, West Lafayette, Ind., 529–543; Jenkins et al. 1981, J. Water Polution Control Fed., 53, 25–32). The acid leaching has resulted in efficient extraction of metals, however, the high operational costs have prevented its widespread use.

Recently, studies have been undertaken to extract metal from wastewater sludges using *Thiobacillus ferroxidans*, a microorganism which had been successfully used to recover metals from mine tailings. However, the requirement of lowering the initial sludge pH to 4.0 to favour the growth of *T. ferrooxidans*, use of cell recycle system in a reactor, and the addition of ferrous sulfate as substrate has increased the operational costs of this approach.

There are several short comings in the available chemical and microbial methods to remove heavy metals from sewage sludge. They are summarized as follows:

1) Chemical methods which are often associated with consumption of acids ($H_2SO_4$, HCl, $HNO_3$, acetic acid and EDTA) are unattractive due to high cost owing to large acid (0.5 to 0.8 g of $H_2SO_4$ per g of dry sludge) and lime requirements. Operational difficulties including the requirement of acid-corrosion resistant apparatus, and safe storage and transportation facilities for acid put constraints on its utilization (Tyagi et al., 1988; Envir. Pollut. 50, 295–316).
2) Removal efficiencies for Fe, Zn, Ni and Cr in 24 hours were more than 76% in the acid treatment methods but Cu could not be solubilized.
3) Combination of heating (95° C.) and 2.0 to 3.5 in 10 to 60 minutes) improved Zn and Ni solubilization but Cu could not be solubilized.
4) Microbial process (in terms of chemical requirements) is 80% cheaper than chemical processes but requires 10 to 14 days (batch time) of incubation time to remove heavy metals from sewage sludge at initial pH 4.0.
5) In the microbial process, addition of ferrous sulphate (up to 20 g/L) enhanced the solubilization of heavy metals to reduce the bioreaction time to 3–4 days (batch time) in the presence of *T.ferrooxidans*. Moreover, acid addition was also required to adjust pH 4.0.
6) Bioreaction time was reduced to as low as 0.75 day using *T. ferrooxidans* in a continuously operated bioreactor with 20% sludge recycle. However, to operate the system continuously is very difficult. Separation and cell (sludge) recycle is also a tedious task due to practical problems.

7) Elemental sulphur is a cheaper substrate but most of the S-oxidizing organisms decrease pH of the synthetic medium (9 k with 0.5 g/L $K_2HPO_4$) at a maximum rate of 0.4 units per day (15 to 23 days). *T.ferrooxidans* and *T.thiooxidans* lowered the pH of sewage sludge from 5.5 to 1.0 in 32 days at 1% sulphur level (Bryant et al., 1983, Can. J. Microbiol. 29, 1159–1170), so very long bioreaction time was required.

8) Most of the acidophilic S-oxidizing bacteria require an initial pH of 4.0 to start the S-oxidation reaction. Therefore, acid is required to lower the pH of the sludge and hence increasing the cost.

9) *Sulfolobus acidocaldarius* is a fast S-oxidizing organism but require high temperature (55° to 85° C.) for the growth (Brock et al., 1972, Arch. Microbiol., 84, 54–68).

It would be highly desirable to have a process which could concurrently remove metals and destroy indicator bacteria (fecal streptococci, fecal coliforms, total coliforms) in municipal sludges to such levels which are compatible with agricultural use of the sludges and without all the above-mentioned drawbacks.

SUMMARY OF THE INVENTION

Surprisingly and in accordance with the present invention, there is provided a process for removing heavy metals and indicator bacteria present in municipal sludges, which comprises:

a) lowering, under aerobic conditions, the pH of a municipal sludge from about 7 to 8 to about 2.5 to 2.0 by treating said sludge with 10% by volume of an inoculum containing a mixture of microorganisms comprising *Thiobacillus thiooxidans* ATCC 55127 and *Thiobacillus thioparus* ATCC 55128 with 1 to 3 g per liter of sulphur, and incubating for a period of at least 40 hours where the heavy metals originally present in said sludge have been substantially solubilized and the concentration of indicator bacteria have been lowered; and b) recovering the metals from the low pH treated sludge of step a).

The municipal sludges which can be treated by the process of the present invention include raw sludges and those which have been subjected to some treatment such as digestion.

The term "heavy metals" when used herein, is intended to include Cu, Zn, Ni, Cr, Cd and Mn.

Other advantages of the present invention will be readily illustrated by referring to the following description.

DETAILED DESCRIPTION OF THE INVENTION

Figure 1:
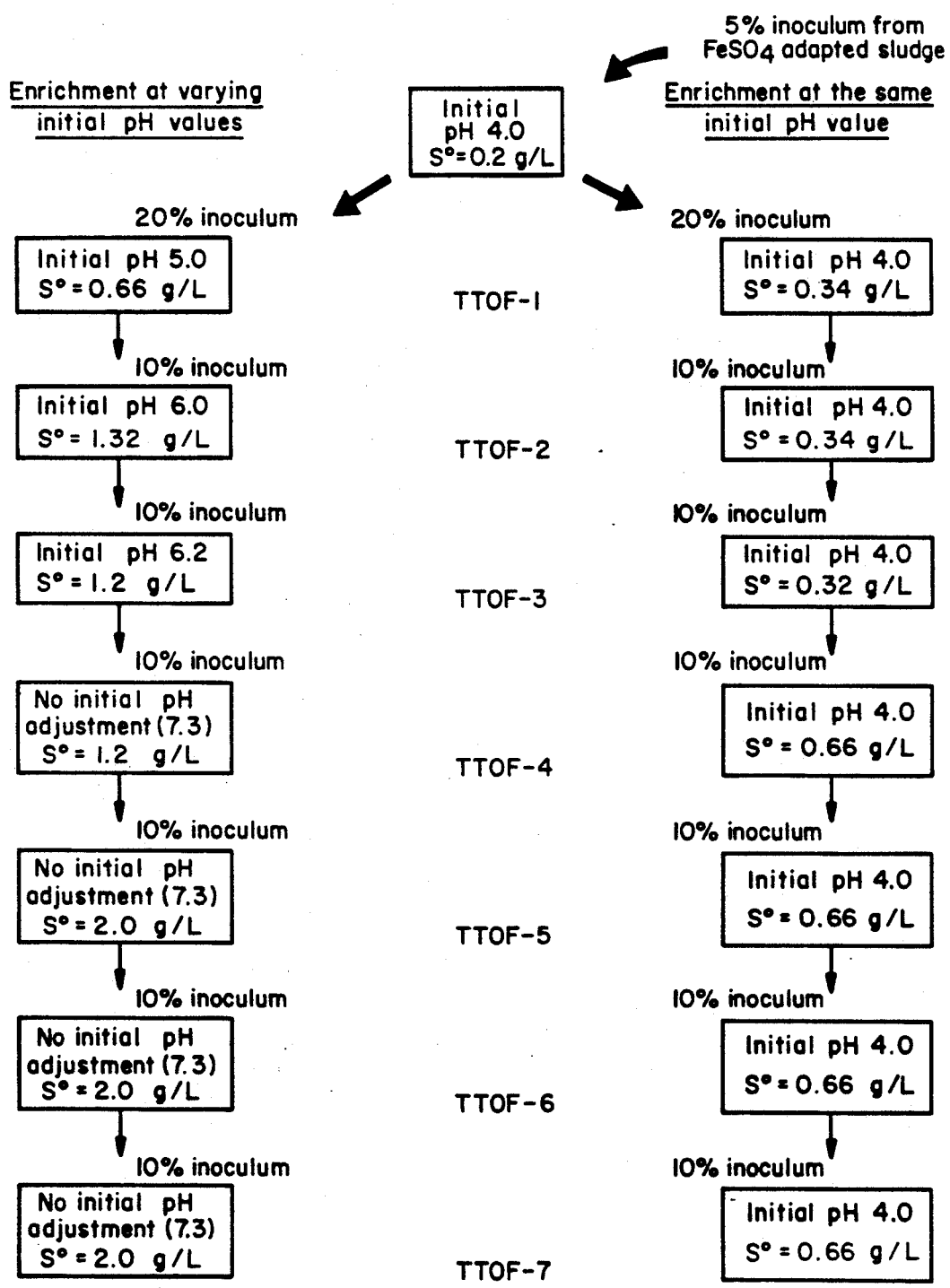
FIG. 1 is the enrichment protocol of the inoculum.

The process according to the present invention for removing heavy metals and substantially destroying indicator bacteria present in municipal sludges, comprises:

a) lowering, under aerobic conditions, the pH of a municipal sludge from about 7 to 8 to about 2.0 to 2.5 by adding to said sludge 10% by volume of an inoculum containing a mixture of microorganisms comprising *Thiobacillus thiooxidans* ATCC 55127 and *Thiobacillus thioparus* ATCC 55128 with 1 to 3 g per liter of sulphur, and incubating for a period of at least 40 hours where the heavy metals originally present in said sludge have been substantially solubilized and the concentration of indicator bacteria have been lowered to a non-toxic level; and b) recovering the metals from the low pH treated sludge of step a).

The microorganisms *Thiobacillus thiooxidans* (ATCC 55127) and *Thiobacillus thioparus* (ATCC 55128) are chemoautotrophs and can derive their metabolic energy from chemical compounds, such as reduced form of inorganic sulphur and reduced iron. Carbon requirements are fulfilled by $CO_2$ from the atmosphere. The energy required for the fixation of $CO_2$ is derived from the oxidation of reduced sulphur compounds to sulphate by the indirect process or by the direct process.

INDIRECT PROCESS

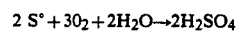

$$2\ S° + 3O_2 + 2H_2O \rightarrow 2H_2SO_4 \qquad 1)$$

Formation of $H_2SO_4$ during the process decreases the pH and contributes towards solubilization of metals.

DIRECT PROCESS

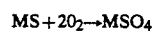

$$MS + 2O_2 \rightarrow MSO_4 \qquad 2)$$

The process according to the present invention to remove heavy metals and indicator bacteria from municipal sludges have the following desired characteristics:

a) It functions at the initial normal pH of the sludge (pH 7.5 to 8.5).

b) The time of the reaction is as small as possible to reduce the reactor size.

c) All the heavy metals (Cu, Zn, Ni, Cr, Cd, Mn) in the sludges are solubilized to a recommended level.

d) It requires a substrate which should be stored and transported easily.

e) Expensive and difficult to operate apparatus are not required.

f) It operates at room temperature.

The microorganisms used in the process of the present invention oxidizes elemental sulphur and metal sulphides to produce sulphuric acid so as to obviate the need of acid addition and at the same time solubilizing heavy metals in much less time to reduce the bioreactor size.

1) Enrichment of the sulphur oxidizing microorganisms of the present invention in nonsterilized municipal sludge Anaerobically digested sewage sludge was obtained from a wastewater treatment plant in Valcartier (Quebec, Canada). An Erlenmeyer flask containing 150 mL of sewage sludge and 0.2 g/L powdered elemental sulphur (Fisher Scientific Co., N.J.) was inoculated with 5% (V/V) very old municipal sludge (3 months) maintained at pH 4.0 and amended with 1 g/L $FeSO_4.7H_2O$. We presumed that many acidophilic bacteria might have developed in this inoculum. The initial pH of the sludge was adjusted to 4.02 with 1N $H_2SO_4$. The flask was incubated on shaker (250 rpm) at 25° C. The pH of the sludge decreased to 2.73 in 85 hours and increased further to 2.79 in 97 hours due to buffering activity of the sludge. This culture was used as inoculum for further enrichment of different groups of microorganisms.

Figure 2:
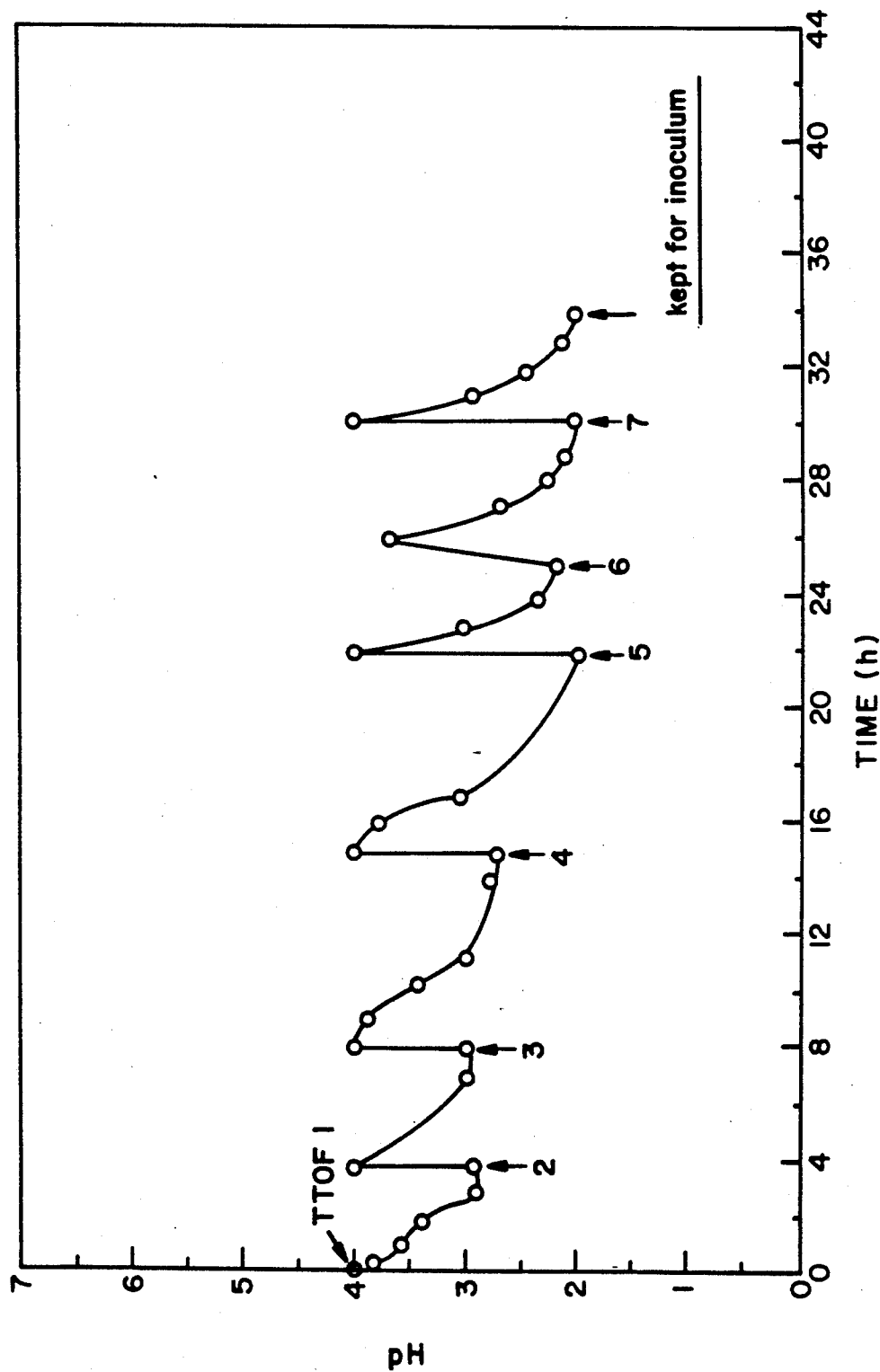
FIG. 2 is a curve of the culture adaptation to pH 4 and enrichment of the inoculum.
Figure 3:
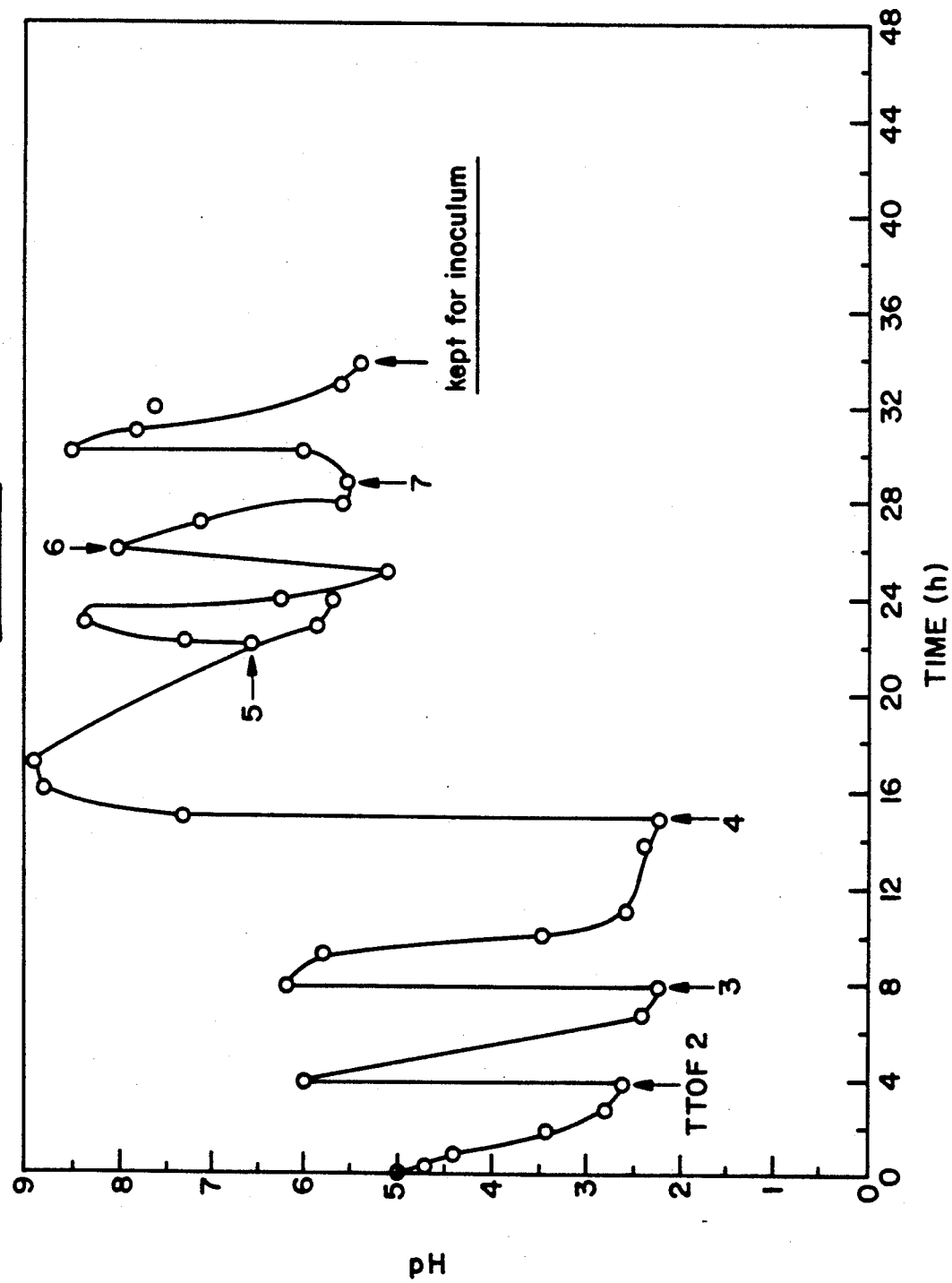
FIG. 3 is a curve of the culture adaptation to pH 7 and enrichment of the inoculum.

The protocol of changes in elemental sulphur concentration, inoculum size and initial pH are given in FIG. 1 and decreases in pH in FIGS. 2 and 3. It can be seen from the Figures that two groups of microflora developed after 34 days of enrichment and incubation that oxidized elemental sulphur to sulphuric acid. One group of microorganisms decreased the initial pH of the sludge from 8.0 to 7.5 (initial pH of the sludge as it comes out of the wastewater treatment plant) to 5.5 and second group decreased the initial pH from 4.0 to 2.0 at which most of the metals are likely to be solubilized.

Figure 4:
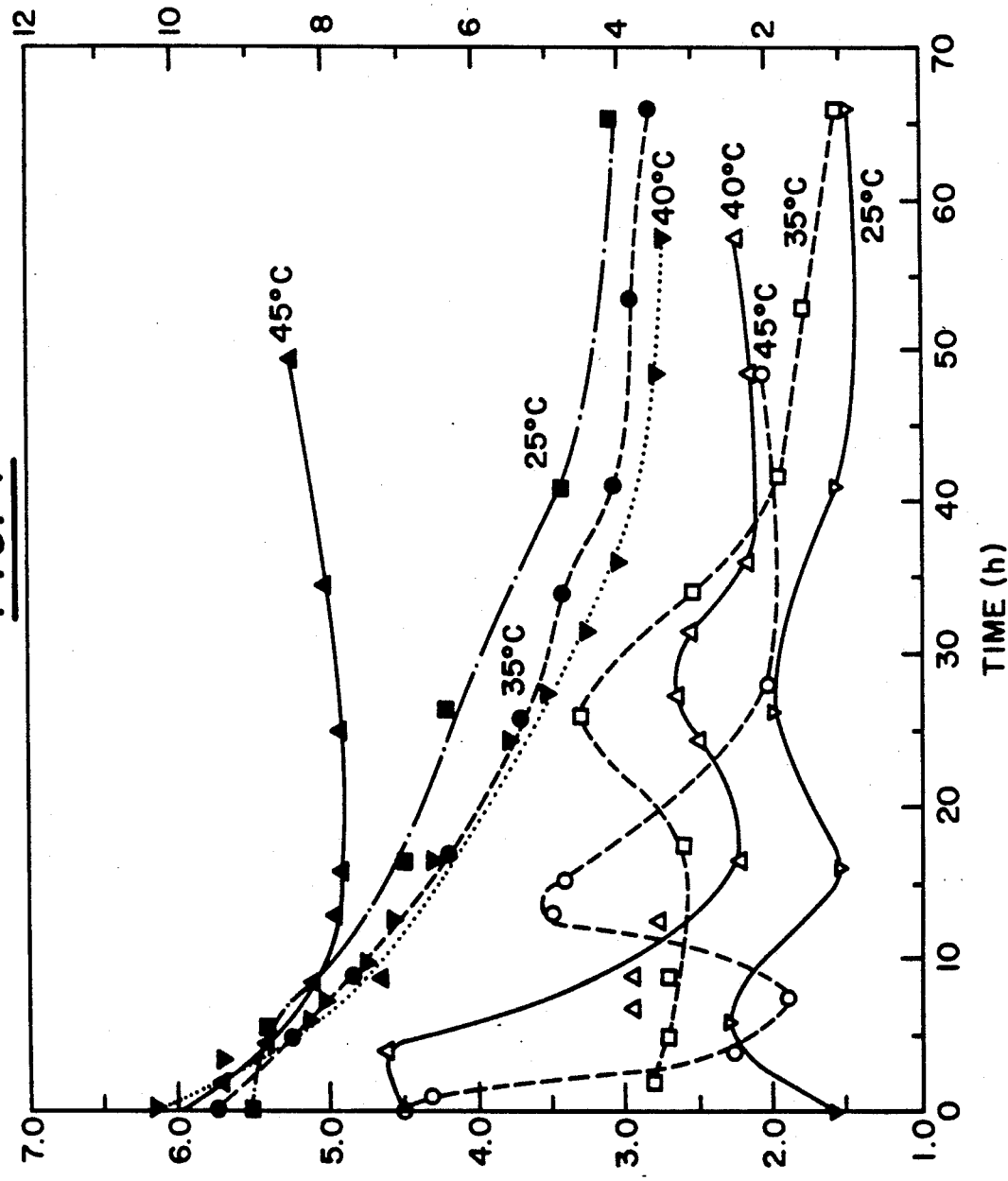
FIG. 4 is a curve of the Oxygen transfer rate (OTR) and pH values of sludge.

The presence of the two groups of microorganisms was also confirmed while measuring oxygen transfer rate (OTR) at different temperatures in order to have growth pattern of the enriched microbial flora. Application of routine growth measuring methods (such as dry weight of cell mass, cell number, turbidometry etc.) is difficult in this system due to the presence of sludge solids. The OTR was measured with the help of an oxygen electrode in batch experiments (3 L working volume reactor) using anaerobic sludge. Six (6) g/L sulphur was added and a 5% inoculum was used. Initial pH was adjusted to 6.0 in this set of experiments. While doing this we observed two maxima in the OTR curve as shown in FIG. 4. This supported the fact that at least two different organisms were involved in this system having two maximum OTR at two different pH. The two groups were characterized as follows:

I) "High pH group" which decreased the pH of the sludge from 8.0-8.9 to 5.3-5.5 and was referred to as strain VA-7(0).

II) "Low pH group" that decreased pH of the sludge from 4.0 to 2.0-1.5 and was referred to as strain VA-4(5)

The process of heavy metal solubilization by these two groups of microorganisms is believed to be as follows:

Sludge
(pH 7 to 9)
Insoluble heavy metals
"High pH group" of organisms (strain VA-7(0))
S°
Sludge
(pH 5 to 6)
Insoluble heavy metals
"Low pH group" of organisms (strain VA-4(5))
S°
Sludge
(pH 2 or less)
Solubilized heavy metals 2) Selective enrichment of the sulphur oxidizing organisms in sterile synthetic medium Microorganisms responsible for S-oxidation were isolated from the enriched culture as developed in FIG. 1. Further steps in the selective enrichment of sulphur oxidizing microorganisms were necessary due to a dominant microflora of non sulphur oxidizing fungi, actinomycetes and bacteria in the enriched culture sludge. The enrichment steps were;

i) growth of sulphur oxidizing organisms in a sterile synthetic medium,
ii) addition of selective antibiotics, and
iii) enrichment by serial dilution.

i) Synthetic medium composition:

A modified 9 k medium of the following composition was used. $(NH_4)_2SO_4$, 3 g; KCl, 0.3 g; $MgSO_4 7H_2O$, 0.5 g; $Ca(NO_3)_2$, 0.01 g; $K_2HPO_4$, 0.5 g; elemental sulphur, 10 g; water, 1000 ml. The pH of the medium was adjusted depending on the nature of the microorganism to be isolated. The medium was modified as required. For solid agar medium, the above mentioned medium was supplemented with Difco-agar (1.5% W/V). Bromothymol blue for pH 8.0 medium and bromophenol blue for pH 6.0 medium were used as pH indicators at a concentration of 0.01 g/l. To increase buffering capacity of the synthetic medium, $K_2HPO_4$ was replaced with K-phosphate buffer (0.01–0.05 M) in few experiments.

ii) Enrichment by the addition of antibiotics:

To identify whether procaryotes or eucaryotes are involved in S-oxidation as well as to remove unimportant groups of microorganisms from the enriched culture, selective antibiotics were added in the medium. Streptomycin which inhibits the growth of procaryotes was used at a concentration of 15 mg/ml and cyclohexiimide which inhibits the growth of eucaryotes was used at a concentration of 25 mg/mL. These are the recommended concentrations of antibiotics to inhibit the groups of microorganisms selectively.

Flasks containing 100 mL synthetic liquid medium as above was inoculated with the enriched inoculum. S-oxidation ($H_2SO_4$ production) was monitored by change in the color of the pH indicator as well as by measuring pH on a pH meter. The pH decreased significantly in the flasks containing medium modified with cyclohexiimide and without any antibiotics within 31 hours whereas there was no significant decrease in the pH of the inoculated medium amended with streptomycin. These results were obtained at initial pH of 8.0 as well as 6.0 indicating that procaryotes (and not eucaryotes) are responsible for S-oxidation.

iii) Enrichment by serial dilution:

Prokaryotic microorganisms were once more enriched in the synthetic medium with cyclohexiimide and 0.02 M K-phosphate buffer. The enriched medium was serially diluted in sterile 0.05 M phosphate buffer and 0.1 ml of the serially diluted cultures were inoculated in the tubes containing 10 ml synthetic medium with pH indicator and 0.02 M phosphate buffer.

The tubes were incubated at room temperature while shaking. After 6 days of incubation, growth of sulphur oxidizing microorganisms in the highest dilution tube was recorded by observing change in the color of pH indicator due to acid production. Sulphur oxidizing microorganisms were further enriched by serial dilution using inoculum from the highest positive dilution tube in which colour of the pH indicator changed due to acid production.

3) Isolation and purification of the two groups of microorganisms

A loopful of microorganisms from the highest positive dilution tube in which color of the pH-indicator changed due to acid production were studied on synthetic agar medium plates. The plates were incubated at room temperature. Single colonies around which color of the pH-indicator changed (turned yellow) were picked up and purified twice on synthetic medium with elemental sulphur. In the subsequent purification procedures elemental sulphur was replaced with 5 g/L $Na_2S_2O_3y5H_2O$. When sodium thiosulphate was added instead of elemental sulphur, the medium was autoclaved for 20 minutes at 15 psig.

4) Screening of the two groups of microorganisms for sulphur oxidation in synthetic liquid medium Several purified colonies (20 to 30) were inoculated in the synthetic liquid medium at initial pH 6.0 and 8.0 and containing 2% (W/V) elemental sulphur. These manipulations were carried out under aseptic conditions. Colonies that decreased pH of the sterile medium due to S-oxidation were maintained on synthetic medium agar plants. Bacterial colonies isolated from "High pH group" (such as Strain VA-7(0)) and "Low pH group" (such as Strain VA-4(5)) were inoculated together in the synthetic liquid medium amended with 2% (W/V) elemental sulphur. Several combinations (total 19 combinations) of bacteria did not decrease pH of the liquid synthetic medium from 8.0 to 2.0. Strain VA-7(0) which decreased pH of the synthetic liquid medium from 8.0 to 5.5 and Strain VA-4(5) which decreased pH of the synthetic liquid medium from 6.0 to 2.0 worked well when mixed together; they decreased pH of the synthetic liquid medium from 8.0 to 2.0 in the presence of 2% elemental sulphur within a period of 48 hours.

5) Partial characterization of selected strains

Strain VA-4(5) did not grow well on the synthetic agar with $Na_2S_2O_3y5H_2O$ but grew better on the synthetic liquid medium with elemental sulphur. This strain is gram-negative, rods and grows around sulphur particles.

Strain VA-7(0) grew well on sterile-agar medium with $Na_2S_2O_3y5H_2O$. Transparent colonies of the strain were gram-negative rods. Both the strains have been maintained in tyndallized sewage sludge containing 2% sulphur so that they do not loose their ability to grow in sewage sludge as well as do not loose their S-oxidation ability.

Figure 5:
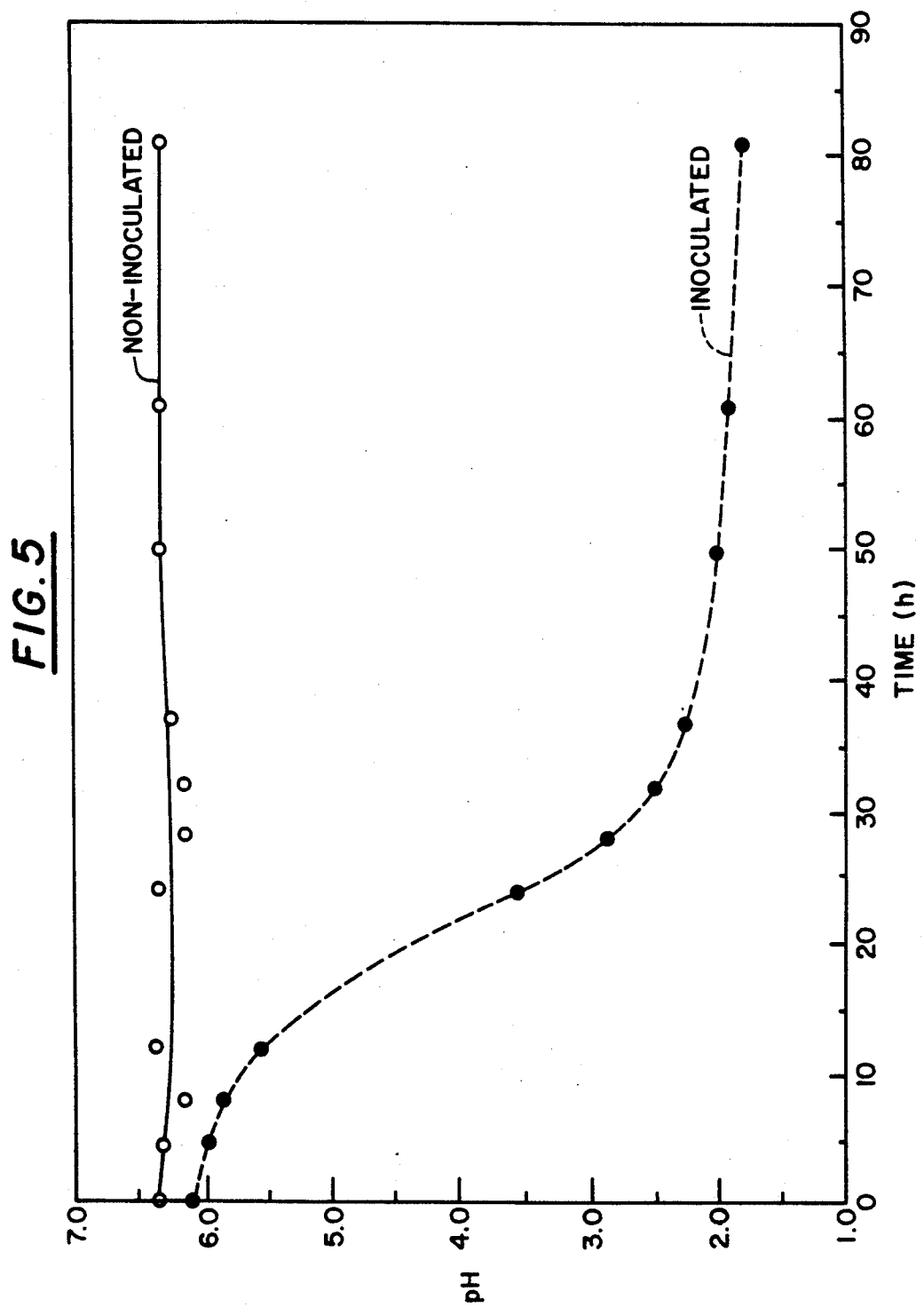
FIG. 5 is a curve of the variation of pH of strain VA-4(5) inoculated.
Figure 6:
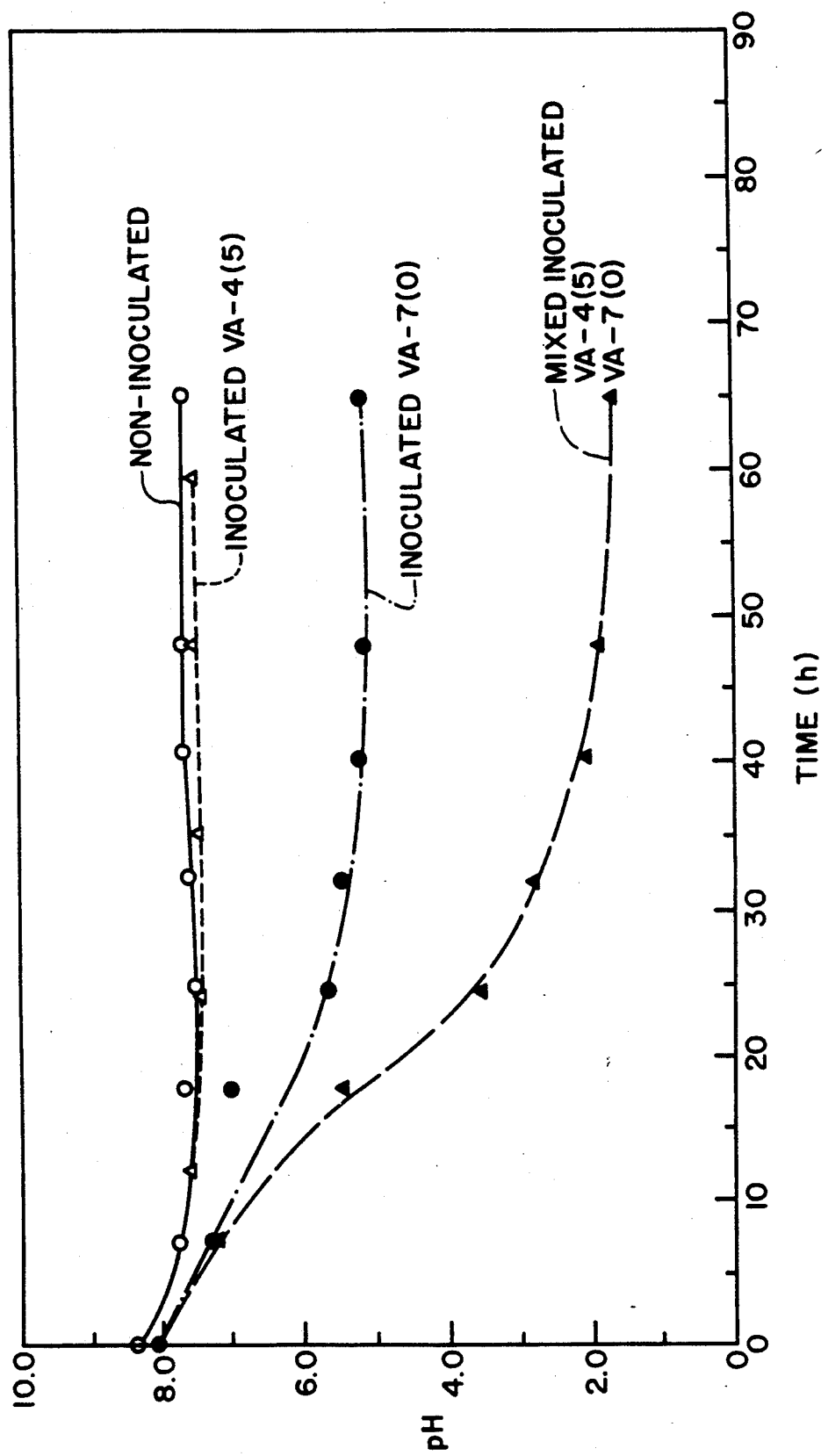
FIG. 6 is a curve of the variation of pH of strain VA-4(5) inoculated, strain VA-7(0) inoculated and a mixture of strain VA-4(5) and VA-7(0) inoculated.

6 Activity of strains VA-7(0) and VA-4(5) in the tyndallized sewage sludge amended with elemental sulphur Strains VA-7(0) and VA-4(5) were used in the inoculation experiments. Twice tyndallized anaerobically digested sludge (2% solids) was amended with elemental sulphur (0.5% W/V). The initial pH of one flask was 6.1 and of other flask was 8.3. The inoculum level of 5% (v/v), prepared in synthetic liquid medium with 2% elemental sulphur, was added in each flask. Strain VA-4(5) decreased pH of tyndallized sludge from 6.1 to less than 2 in 50 hours (FIG. 5) but did not function at pH 8.3 (FIG. 6). Strain VA-7(0) decreased pH of the tyndallized sludge from 8.1 to 5.2 in 40 hours (FIG. 6). A mixed inoculum (5% v/v each strain) decreased pH of the tyndallized sludge from 8.1 to 2 in 40 hours (FIG. 6). In control experiments, flasks without inoculum did not show any drop in pH. There was no contamination in controlled flask.

Figure 7:
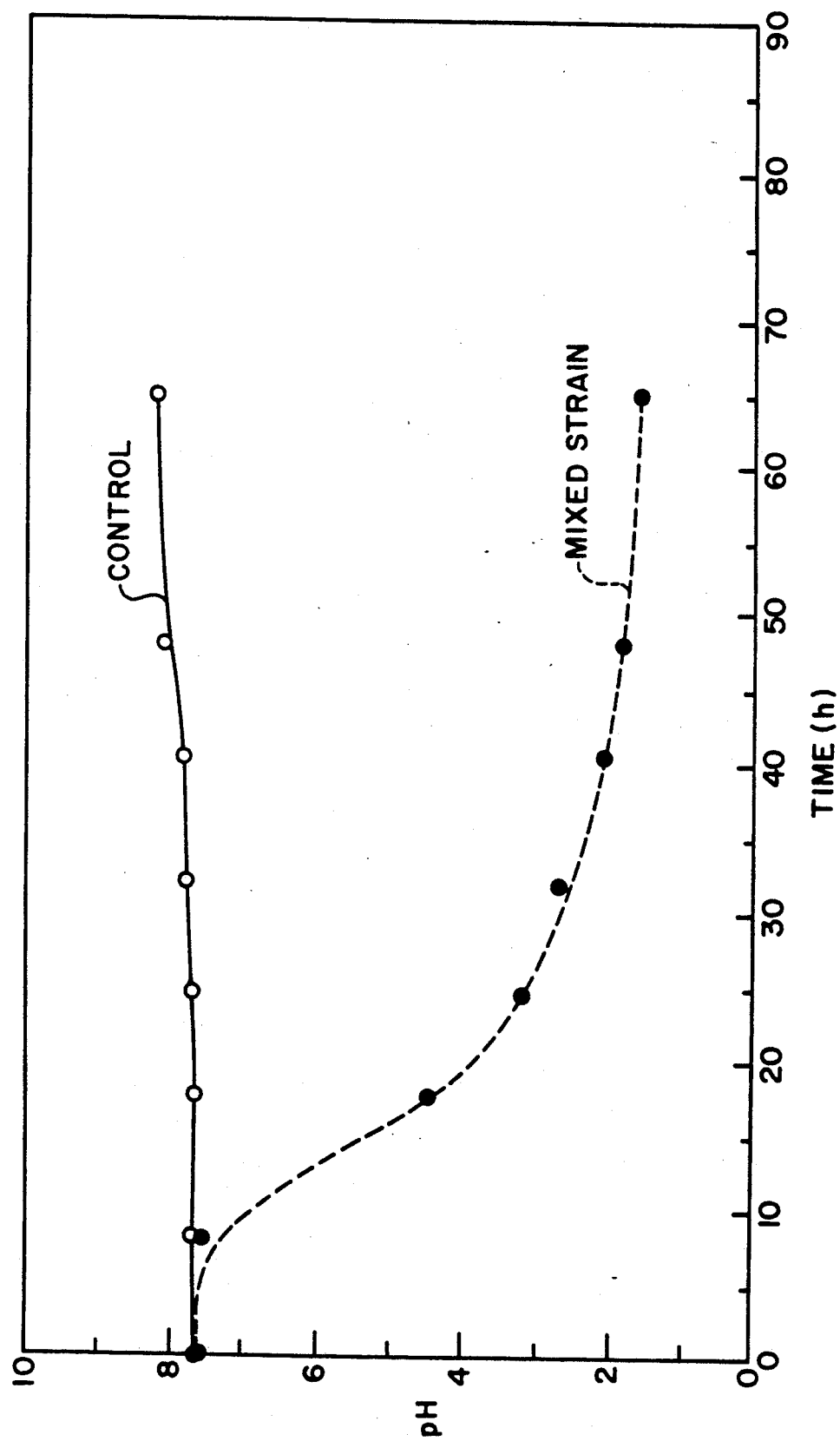
FIG. 7 is a curve of the effect of inoculation of pure culture on pH of non-sterilized sludge.
Figure 8:
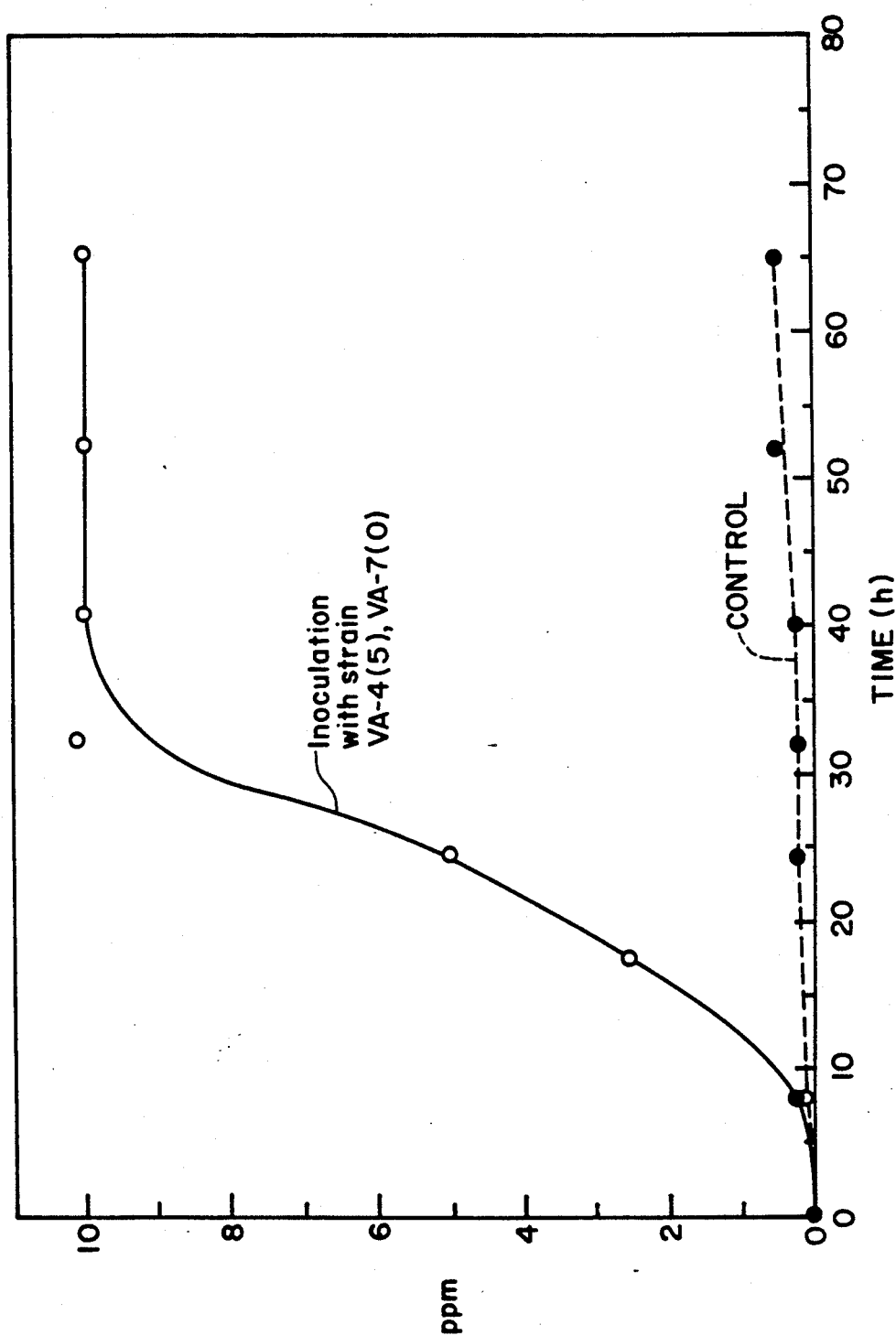
FIG. 8 is a curve of the effect of inoculation of pure culture on "Zn" solubilization.
Figure 9:
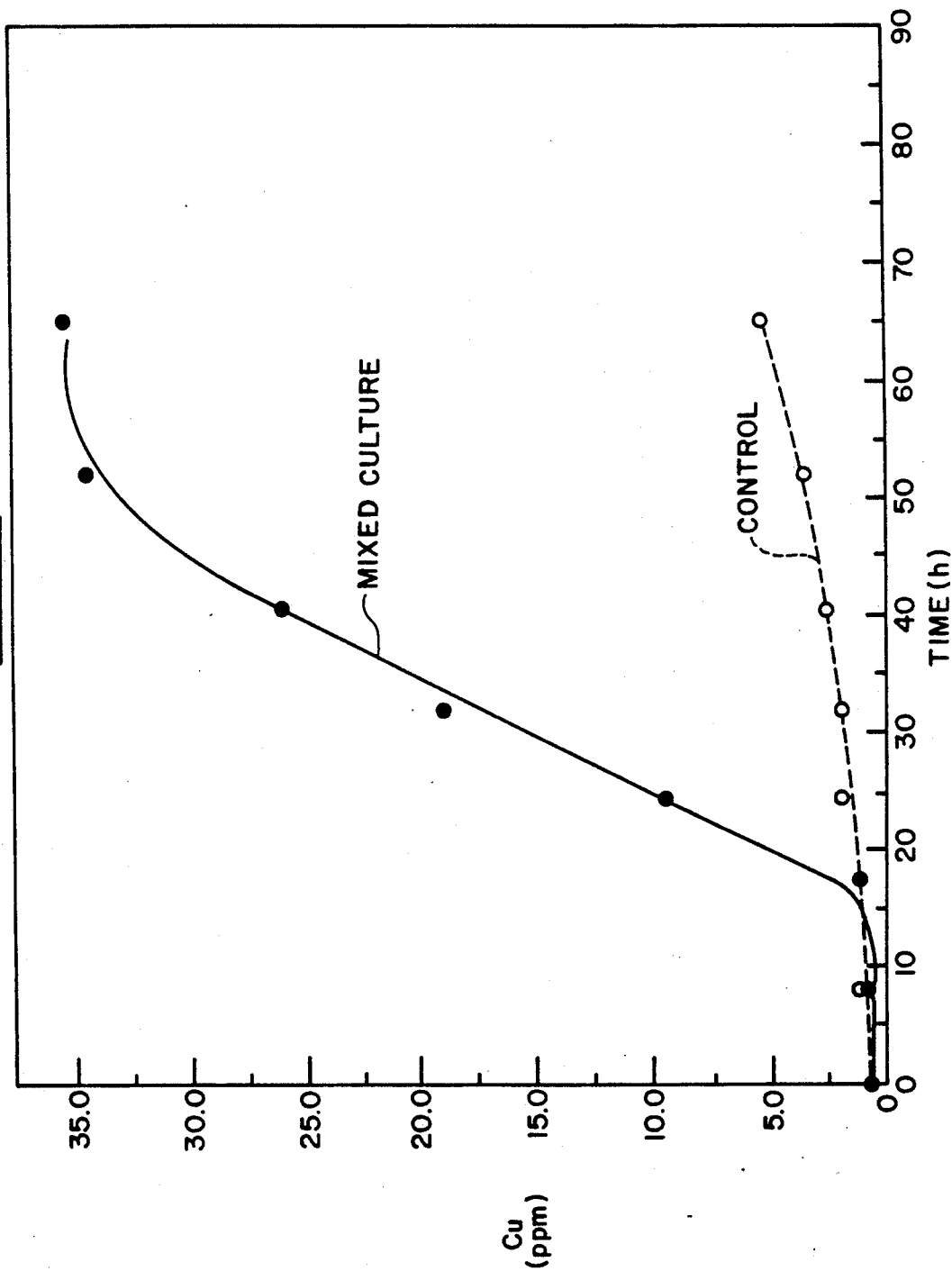
FIG. 9 is a curve of the effect of inoculation of pure culture on "Cu" solubilization.

7) Activity of strains VA-7(0) and VA-4(5) in non sterilized untreated sewage sludge To find out if these strains, VA-7(0) and VA-4(5), solubilized heavy metals in nonsterilized untreated municipal sludge in the presence of other natural sludge microorganisms, inoculum prepared in tyndallized sludge was inoculated in non-sterile anaerobically digested sludge (2% solids) without adjusting pH of the sludge. The sludge was amended with 0.5% elemental sulphur. pH of the sludge decreased from 7.8 less than 2 within 44 hours of incubation (FIG. 7). Analysis of Cu and Zn on atomic absorption spectrophotometer revealed that almost all the Zn was dissolved in 40 hours (FIG. 8) and Cu within 60 hours (FIG. 9). The sludge used in this experiment contained Zn and Cu at 10 mg/L and 35 mg/L sewage sludge, respectively. Recommended level of Cu could be achieved within 39 hours of incubation or 75% of the maximum Cu could be solubilized within 41.5 hours.

8) Inoculum

Since strains VA-7(0) and VA-4(5) competed well against other natural sludge microbial flora for nutrients as well as solubilized sludge heavy metals efficiently, inoculum for further studies were prepared in nonsterilized sludge. Strain VA-4(5) and VA-7(0) were grown in 500 ml Erlenmeyer flasks containing 150 ml of non-sterilized sewage sludge amended with powdered sulphur (0.5% W/V). The flasks were agitated at 200 rpm at room temperature. A 10% volume of the mixture of cells was used as inoculum in all further studies.

9) Storage stability of strains

Storage stability of microbial strains is one of the main concerns in industrial processes. Storage stability of strains VA-4(5) and VA-7(0) was examined in nonsterilized sewage sludge. One 500 ml Erlenmeyer TM flask containing 150 ml nonsterilized sewage sludge was mixed with an inoculum (5% v/v) of strains VA-4(5) and VA-7(0) and 0.5% sulphur. After incubating for 48 hours at room temperature, the flask was stored at 4° C. for 6 months. Six months later, activity of the strains was checked. After three successive transfer in nonsterilized sewage sludge containing sulphur (0.5% v/v) original activity of the strain could be achieved. This shows that strains VA-4(5) and VA-7(0) are very stable strains upon storage in sludge.

10) Factors affecting the solubilization in sewage sludge by strains VA-4(5) and VA-7(0)

Effects of several factors were studied for solubilization of Cu in the sludge obtained from a wastewater treatment plant in Valcartier (Quebec, Canada). Only Cu solubilization was studied because all other heavy metals are solubilized much easily than Cu in chemical and microbial leaching processes. The factors were:

effect of substrate (sulphur) concentration
effect of concentration of sludge solids
effect of initial pH of the sludge There was a positive relationship between the substrate concentration and Cu solubilization; with increasing concentration of sulphur from 0.5 to 10.0 g/L (W/V), the rate of Cu solubilization increased. Acceptable level of Cu solubilization were achieved in 81 h at 0.5 g/L, 60.5 h at 1.0 g/L, 48 h at 2.0 g/L, 45.5 h at 3.0 g/L, 44.5 h at 4.0 g/L, 42.5 h at 5.0 g/L, 25 h at 10.0 g/L and no solubilization at 0,0 g/L of sulphur.

The concentration of sludge solids had significant effect on Cu solubilization. There was a negative relationship between the concentration of sludge solids and Cu solubilization (0.5% sulphur); with increasing concentration of sludge solids, the rates of Cu solubilization decreased. Acceptable levels of Cu solubilization were achieved in 35.5 h at 0.5%, 43.5 h at 3.0%, 54.5 h at 4.0%, and 61.5 h at 5.0% concentration of sludge solids.

The initial pH values of the sludge (2.0% dry weight) had little effect on the time required to dissolve Cu. At initial pH values between 2.0 and 8.0, acceptable levels of Cu were solubilized in 35 to 41 h. The difference in initial pH were compensated by faster rates of pH drop at higher initial pH values and lower rates of pH drop at lower initial pH values.

11) Further applications of the process of the present invention

Apart from digested sludge lixiviation (described above), independent studies were carried out for the applications of this process on primary and secondary activated non-digested sludges from different wastewater treatment plants in Quebec and in Ontario using 10% v/v inoculum. Solubilization of Cu, Zn, Ni, Cd, Mn and Cr was investigated. The above proposed process was efficient in solubilizing heavy metals from all types of sewage sludges to a recommended level set by local governments and municipalities.

The highly unexpected advantages of the combination of T.thiooxidans VA-4(5) and T.thioparus VA-7(0) are the following:

The need of acid addition (to lower pH of the sludge) to favour the growth of bacteria is not required as is required in other existing processes.

The Batch Bioreaction time is reduced to as small as 40 hours.

Process can be used on any type of municipal sludges (primary, secondary and digested).

The process is simple, operates at room temperature and the elemental sulphur required in the process is easy to store, transport, unlike in the acids involving methods.

The *Thiobacillus thiooxidans* (VA-4(5)) and the *Thiobacillus thioparus* (VA-7(0)) have been deposited at the American Type Culture Collection (Rockville, Md. 20852, U.S.A.) and are available to public upon the grant of a patent to the assignee, INRS, disclosing these. These deposits are also available as required by Foreign Patent laws in countries wherein counterpart applications are filed. The deposit accession numbers are ATCC 55127 for the *Thiobacillus thiooxidans* and ATCC 55128 for the *Thiobacillus thioparus*, respectively deposited on Dec. 3, 1990.

The present invention will be more readily understood by referring to the following examples which are given to illustrate the invention rather that to limit its scope.

EXAMPLE 1

Strains

The type strains of *Thiobacillus thiooxidans* (ATCC 19377), *Thiobacillus thioparus* (ATCC 8158), *Thiobacillus acidophilus* (ATCC 27807), *Thiobacillus intermedius* (ATCC 15466) and *Thiobacillus neapolitanus* (ATCC 23640) were obtained from the American Type Culture Collection (ATCC), Rockville, Md. The strains *Thiobacillus thioparus* VA-7(0) and *Thiobacillus thiooxidans* were VA-4(5) isolated from anaerobically digested sludge from the wastewater plant in Valcartier (Quebec, Canada) and were deposited at the ATCC under accession numbers 55127 and 55128 respectively.

CULTURE CONDITIONS

The ATCC strains were routinely maintained by weekly transfer of 1 mL of the spent culture into 100 mL of 0.5% $S_2O_3^-$ or 0.5% tyndalized S° synthetic salts liquid medium ($S_2O_3$-SM or S°-SM), at a pH of 4.0 (*Thiobacillus thiooxidans, Thiobacillus acidophilus,* and *Thiobacillus thiooxidans* VA-4(5), *Thiobacillus thioparus, Thiobacillus intermedius, Thiobacillus neapolitanus* and *Thiobacillus thioparus* VA-7(0). The liquid cultures were incubated at 28° C. in a gyratory incubator shaker (Model 26 TM, New Brunswick Co.) set at 200 rpm.

For comparison, a 0.1% inoculum of a 5-day old sub-culture (in synthetic medium) of each ATCC strains, and mixed culture [0.1% of VA-7(0) and VA-4(5)] were transferred to 150 mL of autoclaved and non-autoclaved anaerobically digested sludge amended with 0.5% tyndalized S° adjusted with 2 N $H_2SO_4$ to pH 4.0 for *T. thiooxidans, T. acidophilus* and strain VA-4(5) and pH 7.0 7.5 (natural sludge pH) for the other strains. The growth in the sludge was measured by the decrease in pH during sulphur oxidation. Controls consisted of 150 mL of non-inoculated autoclaved sludge amended with 0.5% tyndalized S°.

Figure 10:
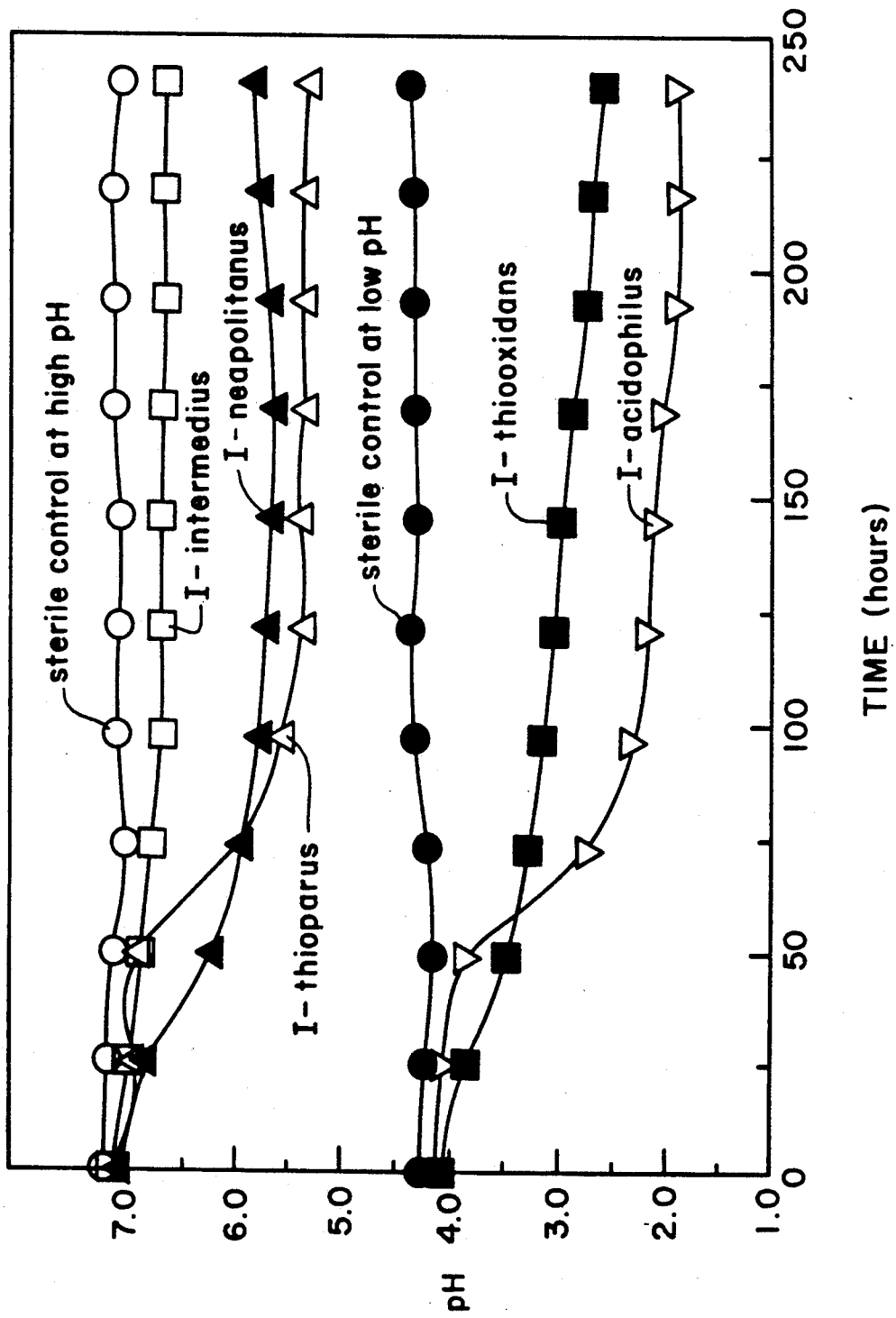
FIG. 10 is a curve of the variation in pH of the autoclaved anaerobically digested sludge during bacterial stains growth in the presence of sulphur.

The pH lowering capacity of anaerobically digested sterile sludge using sulphur oxidation is compared with the isolates VA-7(0) and VA-4(5) (FIG. 11) and five identified strains: *T. thiooxidans* (ATCC 19377), *T. thioparus* (ATCC 8158), *T. acidophilus* (ATCC 27807), *T. intermedius* (ATCC 15466) and *T. neapolitanus* (ATCC 23640) (FIG. 10). The sterile high and low pH controls demonstrated that sulphur oxidation by chemical means is negligible (FIG. 10). Similarly, intermedius did not seem to grow in sludge by sulphur oxidation as evaluated by pH measurements, even if the growth on carbon compounds could have been possible. However, both *T. thioparus* and *T. neapolitanus* can oxidize sulphur in this environment, but their metabolic activities (pH drop) were very slow.

The isolate VA-7(0), which has been identified as a strain of *T. thioparus* is well adapted to this medium and caused a reduction in sludge pH to a value of 4.2 in 4 days. The isolate, VA-4(5) has been identified as a strain of *T. thiooxidans*.

*T. thiooxidans* appears to be able to grow in the sludge, but the sulphur oxidation rate is very low; that is 3 to 4 weeks are required to lower the pH to values below 2.0.

Figure 11:
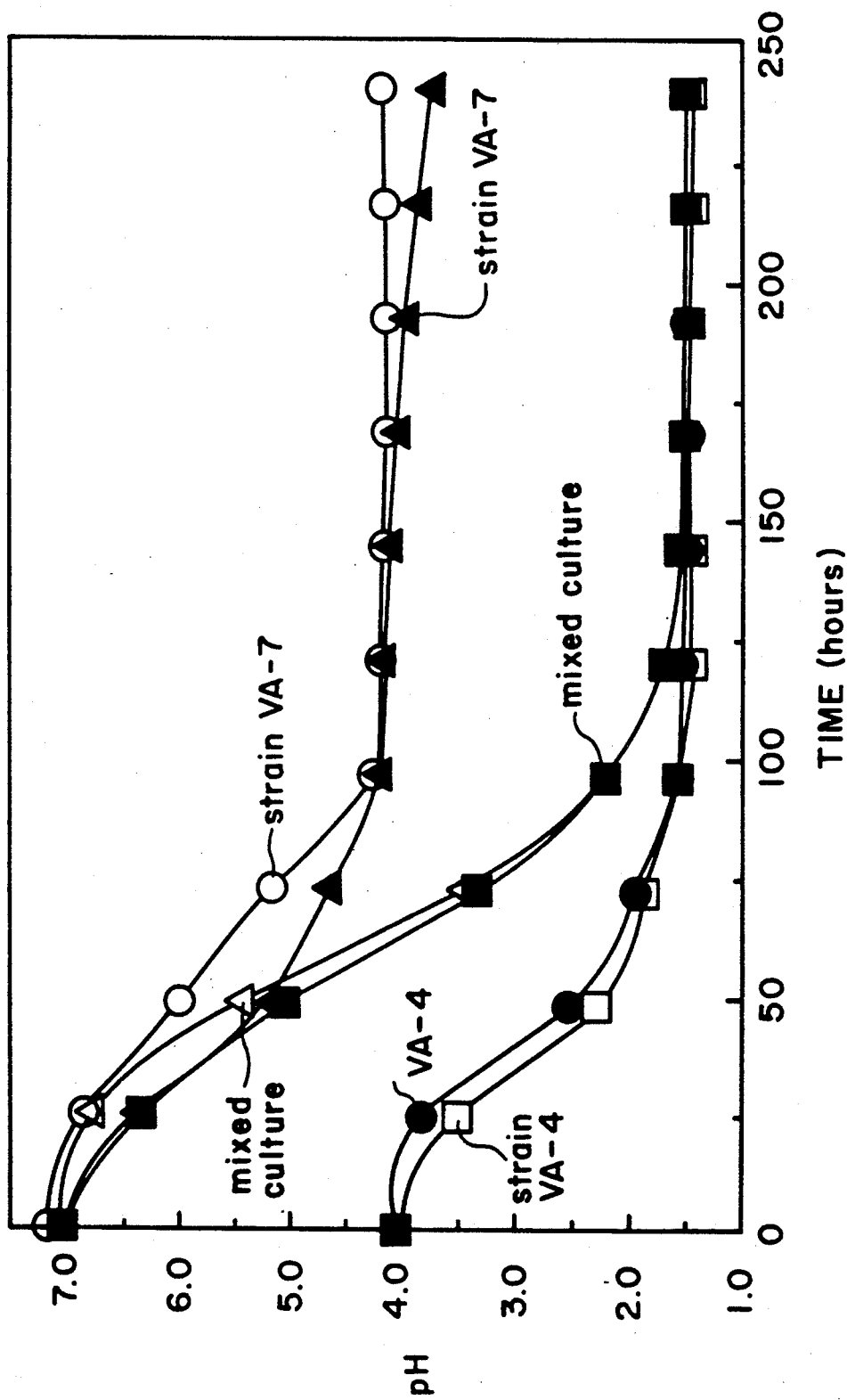
FIG. 11 is a curve of the variation in pH of the non-autoclaved and autoclaved anaerobically digested sludge during bacterial growth in the presence of sulphur.

Sludge inoculated with the mixed culture (VA-7(0) and VA-4(5) was acidified from an initial pH of 7.1 to a final pH of 1.7 in 5 days. The patterns of pH reduction in autoclaved and non-autoclaved sludge inoculated with strain VA-7(0), strain VA-4(5) and the mixed culture of both are similar (FIG. 11). A mixture of ATCC stains *T.thiooxidans, T.thioparus, T.acidophilus, T.neapolitanus,* was also inoculated, but the pH did not decrease below 5.0.

This example clearly establish that a mixture of VA-7(0) and VA-4(5) reduces the pH of the sludge from 7 7.5 (natural pH of sludge) to a final pH 2.0 and at the same time solubilizing all concerned metals (Cu, Cr, Ni, Zn, Cd and Mn). Whereas metal solubilization was not observed while utilizing a mixture of said ATCC strains.

In the sludge, pH reduction occurs in a single step, while in the synthetic medium, a 2 day lag period was observed after the initial pH reduction carried out by strain VA-7(0). Similarly, in the synthetic medium, a 3 day lag phase was observed prior to the initial pH reduction, while only a single day was required in the sludge environment.

EXAMPLE 2

Inoculum was prepared by growing a mixed culture of strains (VA-7(0) and VA-4(5)) in a 500 mL Erlenmeyer flask containing 150 mL of the sludge supplemented with 0.3% tyndalized powdered sulphur. The flasks were agitated at 200 rpm and maintained at 28° C. in a gyratory incubator shaker. A volume of 200 mL of non-sterilized Beauceville (Québec) Secondary sludge (14033 mg/L of total solids) and Black Lake aerobically digested sludge (24394 mg/L of total solids) were supplemented separately with 0.3% tyndalized powdered sulphur, and a 10% inoculum was utilized for the leaching experiment. Fifteen mL samples were withdrawn from the flasks each half-day for trace metal analysis. The samples were centrifuged at 20 000× g for 15 min and metal concentration in the liquid fraction were determined by Plasma Emission Spectroscopy (ICP) with a Thermo Jarrell Ash Corporation, Atom Scan 25 TM apparatus. To determine metal concentration in sludge, the latter was first digested in $HNO_3$, HF and $HClO_4$ according to APHA (Standard Methods of Examination of Water and Wastewaters, 1989, 17th Edition, American Public Health Association, Washington, D.C.). Trace metal concentrations in sludge, as well as recommended minimum levels for agricultural use are shown in Table 1 below.

TABLE 1

Heavy metal concentration in the sludge and their recommended level for disposal in agriculture.

| Metal | Concentration (mg/kg of dry sludge) Beauceville | Black Lake | Recommended level (mg/kg of dry sludge) |
|---|---|---|---|
| Cd | 5.0 | 10 | 10 |
| Cr | 87.0 | 1719 | 500 |
| Cu | 21.5 | 1827 | 600 |
| Mn | 993 | 395 | 500 |
| Ni | 28 | 177 | 100 |
| Pb | 110 | 336 | 300 |
| Zn | 419 | 596 | 1750 |

Metal Solubilization

The pH of Beauceville sludge was decreased to 2.0 in 40 hours from an initial pH of 7.8 whereas the pH of Black Lake sludge was decreased to 1.8 from an initial pH 6.4 in the same time.

The degree of leaching of heavy metals from the solid phase in the sludge as well as the concentrations measured in the liquid phase are shown in Table 2 below.

TABLE 2

Metal solubilization from the sludge after 40 hrs of microbial leaching with mixed culture.

| Metal | BEAUCEVILLE SLUDGE LIQUID FRACTION (mg/L) Initial | Final | % rem. | BLACK LAKE SLUDGE LIQUID FRACTION (mg/L) Initial | Final | % rem. |
|---|---|---|---|---|---|---|
| Cd | 0.00 | 0.05 | 60 | 0.00 | 0.150 | 70 |
| Cr | 0.00 | 0.85 | 70 | 0.00 | 33.54 | 80 |
| Cu | 0.00 | 0.30 | 40 | 0.00 | 37.85 | 85 |
| Mn | 0.50 | 10.47 | 80 | 0.60 | 37.88 | 85 |
| Ni | 0.00 | .1178 | 30 | 0.00 | 8.2 | 60 |
| Pb | 0.00 | 0.463 | 15 | 0.00 | 4.0 | 50 |
| Zn | 0.00 | 5.29 | 90 | 0.00 | 13.81 | 95 |

*% rem. = % of removal

The results show that after 40 hours of leaching, Cr, Cu, Ni, Pb, and Mn concentration fell below the recommended levels for sludge use in agriculture. The initial concentration of Cd, and Zn in the solid phase were already below the recommended limits for agricultural use (Table 1). However, a substantial amount of Cd and Zn was also solubilized.

Although our sludge was highly contaminated with copper and chromium, the level of required solubilization was attained in 40 hours. Manganese appears first in the leachate with more than 80% appearing after 24 hours. Zinc, cadmium and nickel begin to solubilize after approximately the same time at a pH of 4.0 to 4.5. Copper solubilization begins after 24 hours incubation (pH 2.8). Lead and chromium are not solubilized until pH levels drop below 2.5.

The pH reduction in the anaerobically digested, aerobically digested and non-digested, sludges were more rapid than in the synthetic medium. Thus it appears that the chemical composition of the sludge enhances the initial growth of the two strains; the growth of strain VA-4(5) begins during the pH reduction phase by strain VA-7(0) and occurs at pH levels that are too high to permit initial growth of the former in the synthetic medium. These results are surprising since the sludge has a high buffering capacity and is enriched with a variety of potentially toxic substances such as heavy metals and organic compounds. The capacity of adaptation to high metal concentrations has been shown repeatedly in *Thiobacillus ferrooxidans*. However, in other thiobacilli, this property has been seldom examined in spite of several studies on strains isolated from metal contaminated areas. Since trace metal solubilization increases the concentration of the biologically available metal ions in solution, it appears that these rapidly growing bacterial strains VA-7(0) and VA-4(5) possess high resistance to these metals.

The utilization of the strains VA-7(0) and VA-4(5) to remove heavy metals from municipal sludge also requires that they be resistant to many other toxic organic compounds. Indeed, many toxic substances (anthracene, phenanthrene, phenol, PCBs) in relatively high concentrations have been discovered in municipal sludge. Although toxic organic compounds were not measured in the sludge used in our experiments, our results suggest that in contrast with the collection strains used in this study (FIG. 10 and 11), isolates VA-7(0) and VA-4(5) were not significantly inhibited by sludge toxic and organic- compounds.

EXAMPLE 3

Indicator Bacterial leaching of *T. thiooxidans* (ATCC 55127) and *T. thioparus* (ATCC 55128) compared to other strains.

The sludges were obtained from three different wastewater treatment plant in the province of Québec:

Beauceville (sec on day), Black Lake (non-digested concentrated and non concentrated), Ste-Claire (secondary). Samples were collected in sterile polypropylene bottles, shipped cold, and kept at 4° C. before utilization.

Before growing inoculum the mixed culture was also adapted to the sludge type by two or three transfers. The inoculum was prepared by growing a mixed culture of strains (VA-7(0) and VA-4(5)) in a 500 mL of the sludge supplemented with 0.3% tyndalized powdered sulphur. The same sludge was used to grow the inoculum as in the experiments (i.e. to make the test run on Beauceville sludge, inoculum was also grown in Beauceville sludge). To grow inoculum, the flasks were agitated at 200 rpm and maintained at 28° C. in a gyratory incubator shaker.

A volume of 200 mL of non-sterilized above mentioned three sludges (Beauceville, Black Lake and Ste-Claire, total solids concentration 14033, 24394 and 1688 mg/L respectively) were supplemented separately with 0.3% tyndalized powdered sulphur, and a 10% inoculum was utilized for the leaching experiments. Fifteen mL samples were withdrawn from the flasks each half-day for trace metal analysis and for detection of indicator bacteria. All experiments were carried out in triplicate. All indicators bacterial populations in sludge were enumerated by direct plating on appropriate selective media.

The samples were prepared according to the modified technique of Dudley et al. (Appl. Env. Microbiol., 39, 118-126 1980). Vortex mixing was carried out at high speed for 2 min. of 5 mL of sludge with 15 mL of sterile phosphate-buffered saline (0.1 M, pH=7.2), containing approximately 1 g of sterile 4-5 mm diameter glass beads in a 50 ml centrifuge tube. Samples were diluted serially in sterile phosphate-buffered saline, and 0.1 mL samples were spreaded with sterile glass L-rods over each of three replicates plate. Commercially available dehydrated media, Difco Laboratories were used Total coliforms were assayed on m-Endo agar LES, fecal coliforms were assayed on m-Fc agar, fecal streptococci were determined on m-Enterococcus agar. Incubation of plates was carried out at 35° C. for 24 hour for total coliforms, 35° C. for 48 hours for fecal streptococci and at 44.5° C. for 24 hours for fecal coliforms.

of thiobacilli and mortality of total coliforms. Therefore, this process permits the reduction of indicator bacteria to levels compatible with the agricultural use of sludge, since the total coliform concentrations encountered ($10^3$ CFU/100 mL) are similar or lower than concentrations normally found in agricultural soils.

The concentration of toxic metals (Cu, Cd, Ni, Zn, Cr and Pb) was also achieved below the acceptable limit (same as in Table 1) as per recommended limits in these experiments.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

We claim:

1. A process for removing heavy metals and substantially destroying indicator bacteria present in municipal sludges, which comprises:
   a) lowering, under aerobic conditions, the pH of a municipal sludge from about 7 to 8 to about 2.0 to 2.5 by adding to said sludge 10% by volume of an inoculum containing a mixture of microorganisms comprising *Thiobacillus thiooxidans* ATCC 55127 and *Thiobacillus thioparus* ATCC 55128 with 1 to 3 g per liter of sulphur, and incubating for a period of at least 40 hours where the heavy metals originally present in said sludge have been substantially solubilized and the concentration of the indicator bacteria have been lowered to a non-toxic level; and
   b) recovering the metals from the low pH treated sludge of step a).

2. In a process for removing heavy metals and substantially destroying indicator bacteria present in municipal sludges by treating said sludges with a metal solubilizing microorganism,
   separating the liquid phase of the low pH sludges from the solid phase; and
   recovering the solubilized metals from the liquid

TABLE 3

| Sludge | | pH | Fecal Coliforms (CFV/100 mL) | Fecal Streptococci (CFV/100 mL) | Total coliforms (CFV/100 mL) | Destruction of total coliforms (%) |
|---|---|---|---|---|---|---|
| *Variation of indicator bacteria in the sludges after 40 hrs of microbial leaching* | | | | | | |
| Beauceville | Initial | 6.5 | — | — | $1.2 \times 10^6$ | |
| (secondary) | Final | 1.85 | — | — | $<1.0 \times 10^3$ | >99.9% |
| Black Lake | Initial | 6.8 | $1.5 \times 10^6$ | $1.5 \times 10^5$ | $7.3 \times 10^4$ | |
| (non-digested) | Final | 1.76 | $1.0 \times 10^3$ | $1.0 \times 10^3$ | $<1.0 \times 10^3$ | >98.6% |
| (solids = 6.84 g/L) | | | | | | |
| Ste-Claire | Initial | 7.0 | — | — | $7.2 \times 10^7$ | |
| (secondary) | Final | 1.72 | — | — | $2.93 \times 10^4$ | >99.06% |
| Black Lake | Initial | 6.5 | $1.0 \times 10^7$ | $1.0 \times 10^6$ | $1.2 \times 10^8$ | |
| non-digested concentrated | Final | 1.8 | $1.0 \times 10^3$ | $1.0 \times 10^3$ | $1.0 \times 10^3$ | |
| (solids = 17.4 g/L) | | | | | | |

— not detected

In Table 3, there is shown the results of initial and final concentration of indicators bacteria in different sludges at the end of 40 hours of microbial leaching. The elimination of the total coliforms occurs with a large mortality (>98% or more than 3-4 log cycles). It is also evident from the results of Black Lake sludge (concentrated and non-concentrated) that the solids concentration is not an important factor for the growth phase of the low pH sludges;
the improvement which comprises:
   lowering, under aerobic conditions, the pH of municipal sludges from about 7 to 8 to about 2.0 to 2.5 by adding to said sludges 10% by volume of an inoculum containing a mixture of microorganisms comprising *Thiobacillus thiooxidans* ATCC 55127 and *Thiobacillus thioparus* ATCC 55128 with 1 to 3 g per liter of sulphur, and incubating for a period of at least 40 hours where the heavy metals originally present in said sludges have been substantially solubilized and the concentration of the indicator bacteria have been lowered to a non-toxic level.

3. A process of solubilizing heavy metals and for lowering to a non-toxic level the concentration of indicator bacteria present in municipal sludges, which comprises:

lowering, under aerobic conditions, the pH of a municipal sludge from about 7 to 8 to about 2.0 to 2.5 by adding to said sludge 10% by volume of an inoculum containing a mixture of microorganisms comprising *Thiobacillus thiooxidans* ATCC 55127 and *Thiobacillus thioparus* ATCC 55128 with 1 to 3 g per liter of sulphur, and incubating for a period of at least 40 hours where the heavy metals originally present in said sludge have been substantially solubilized and the concentration of the indicator bacteria have been lowered to a non-toxic level.

4. A mixture of microorganisms comprising 50±5% of a biologically pure culture of *Thiobacillus thiooxidans* ATCC 55127 and 50±5% of a biologically pure culture of *Thiobacillus thioparus* ATCC 55128.

* * * * *